US012491462B2

(12) United States Patent
Kaneko (10) Patent No.: US 12,491,462 B2
(45) Date of Patent: Dec. 9, 2025

(54) SAFETY WORK DEVICE (71) Applicant: Hitachi Industrial Equipment Systems Co., Ltd., Tokyo (JP)

(72) Inventor: Takeshi Kaneko, Tokyo (JP)

(73) Assignee: HITACHI INDUSTRIAL EQUIPMENT SYSTEMS CO., LTD., Tokyo (JP)

( * ) Notice: Subject to any disclaimer, the term of this patent is extended or adjusted under 35 U.S.C. 154(b) by 0 days.

(21) Appl. No.: 18/265,573

(22) PCT Filed: Jul. 26, 2022

(86) PCT No.: PCT/JP2022/028713
§ 371 (c)(1),
(2) Date: Jun. 6, 2023

(87) PCT Pub. No.: WO2024/023907
PCT Pub. Date: Feb. 1, 2024

(65) Prior Publication Data
US 2024/0375033 A1    Nov. 14, 2024

(51) Int. Cl.
*B01D 46/42*    (2006.01)
*B01D 46/62*    (2022.01)
(Continued)

(52) U.S. Cl.
CPC ......... *B01D 46/4227* (2013.01); *B01D 46/62* (2022.01); *B01D 46/88* (2022.01);
(Continued)

(58) Field of Classification Search
CPC .... B01D 46/4227; B01D 46/62; B01D 46/88; B01D 2267/60; B01D 2279/35;
(Continued)

(56) References Cited

U.S. PATENT DOCUMENTS 4,832,717 A * 5/1989 Peters ..................... F24F 3/163
                                                    55/385.2
6,149,699 A * 11/2000 Grantham .............. B01D 46/88
                                                      96/138
(Continued)

FOREIGN PATENT DOCUMENTS

JP    2003-130412 A    5/2003
JP    2004-044823 A    2/2004
(Continued)

OTHER PUBLICATIONS

Korean Office Action issued on Mar. 28, 2025 for Korean Patent Application No. 10-2023-7017254.

*Primary Examiner* — Jennifer Dieterle
*Assistant Examiner* — Phillip Y Shao
(74) *Attorney, Agent, or Firm* — Volpe Koenig (57) ABSTRACT A safety work device having a plurality of HEPA filters in an exhaust system suppresses leakage of contaminants. The work device includes: a work space; a front shutter covering part of a front opening surface of the work space; a work opening portion below the front shutter, through which a worker puts hands to perform work; a rear port provided at a lower portion of a back surface of the work space to suction air; and an exhaust flow path provided behind the back surface of the work space to exhaust the air in the work space. A first HEPA filter for exhaust is disposed in a vertical direction in the exhaust flow path and behind the rear port, and a second HEPA filter for exhaust is disposed in the vertical direction in the exhaust flow path and on a downstream side of the first HEPA filter.

12 Claims, 10 Drawing Sheets

(51) Int. Cl.
*B01D 46/88* (2022.01)
*F24F 3/163* (2021.01)
*F24F 8/108* (2021.01)

(52) U.S. Cl.
CPC .............. *F24F 3/163* (2021.01); *F24F 8/108* (2021.01); *B01D 2267/60* (2013.01); *B01D 2279/35* (2013.01)

(58) Field of Classification Search
CPC ..... B01L 1/00; B08B 15/02; B08B 2215/006; B08B 15/04; B25H 1/20; F24F 3/163; F24F 7/06; F24F 8/108
See application file for complete search history.

(56) References Cited

U.S. PATENT DOCUMENTS

| | | | | |
|---|---|---|---|---|
| 2012/0019110 A1* | 1/2012 | Ono | ............ | B25J 21/02 |
| | | | | 312/1 |
| 2017/0341762 A1* | 11/2017 | Breigenzer | ............ | B01D 46/12 |
| 2020/0038794 A1* | 2/2020 | Dobbyn | ............ | B01D 46/0086 |

FOREIGN PATENT DOCUMENTS

| | | | |
|---|---|---|---|
| JP | 2004-351283 | A | 12/2004 |
| JP | 2010-203755 | A | 9/2010 |
| JP | 2012-000531 | A | 1/2012 |
| JP | 2012-024657 | A | 2/2012 |
| JP | 2013-160474 | A | 8/2013 |
| JP | 2018-176006 | A | 11/2018 |
| JP | 2022-086442 | A | 6/2022 |
| WO | 2013/150684 | A1 | 10/2013 |

* cited by examiner

FIG. 10 excellent# SAFETY WORK DEVICE

TECHNICAL FIELD

The present invention relates to a safety work device such as a safety cabinet or a draft chamber that allows a worker to safely perform work when handling hazardous substances such as highly active substances.

BACKGROUND ART

In the development of pharmaceuticals and research on pathogens such as viruses, a safety cabinet is used for the protection of a worker, the protection of samples, and the like. In the safety cabinet, air in a work space in which a contaminant is handled is filtered by a high efficiency particulate air filter (HEPA filter) so as to prevent the contaminant from being exhausted outside the device, and the air from which the contaminant is removed is exhausted outside the device.

Figure 10:
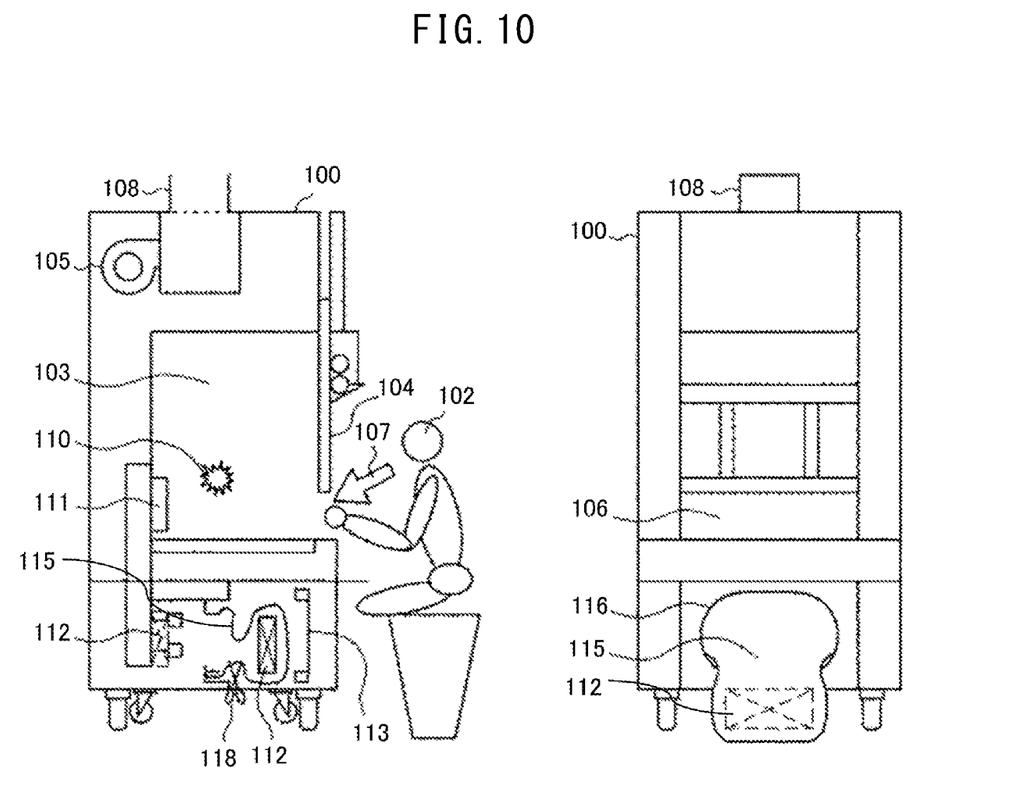
FIG. 10 is a view showing one example of a chemical hazard countermeasure cabinet of the related art.

As one example, a "chemical hazard countermeasure cabinet" described in Patent Document 1 is shown in FIG. 10. In a chemical hazard countermeasure cabinet 100, a pre-filter 111 is provided on a back surface of a work space 103, and a HEPA filter 112 is provided below the work space 103. Incoming air 107 suctioned from a work opening portion 106 below a front shutter 104 is suctioned through the pre-filter 111, together with a contaminant 110 in the work space, the contaminant 110 is removed by the HEPA filter 112, and the air is exhausted outside the device from an exhaust port 108 by an air blower 105. In addition, below the work space 103 and on a front surface side of the HEPA filter 112, a HEPA filter cover 113 and a vinyl bag attachment flange 116 are provided and a vinyl bag 115 is attached. When the HEPA filter 112 to which a contaminant or dust adheres is replaced, the HEPA filter cover 113 is removed, the vinyl bag 115 stored inside the vinyl bag attachment flange 116 is pulled out, and the HEPA filter 112 is removed through the vinyl bag 115. The removed HEPA filter 112 is stored in the vinyl bag 115, and the vinyl bag 115 is cut by a cutting and welding machine 118 and is sealed (refer to FIG. 6 of Patent Document 1).

In addition, a draft chamber (local exhaust device, Fume hood) is also used for safety when a hazardous substance is handed.

CITATION LIST

Patent Document

Patent Document 1: JP 2013-160474 A

SUMMARY OF THE INVENTION

Problems to be Solved by the Invention

In the safety cabinet, since the HEPA filter filters a contaminant or dust, the HEPA filter gradually becomes clogged and needs to be replaced. When the HEPA filter is replaced, ensuring safety is required to prevent the contaminant from affecting a worker. When pathogens such as viruses or cells are handled, a safe state can be obtained by performing sterilization. On the other hand, when substances that cannot be sterilized, such as highly active substances such as anticancer agents, are handled, as described in Patent Document 1, the HEPA filter is enclosed in the vinyl bag, is sealed, and is taken out of the device.

In addition, in the safety cabinet, when highly toxic substances are handled, air detoxified by passing contaminated air through the HEPA filter for exhaust twice is exhausted. Two HEPA filters for exhaust are provided, 99.97% or more of a contaminant can be removed by passing through a first HEPA filter, and almost 100% of the contaminant can be removed by passing through a second HEPA filter.

However, when the two HEPA filters, the first HEPA filter and the second HEPA filter, are installed, the installation area becomes widened and it becomes difficult to save space. In addition, if the contaminant recovered by the HEPA filter re-scatters when the HEPA filter is replaced, there is a possibility that the contaminant is exhausted directly outside the device without passing through the HEPA filter.

In the "chemical hazard countermeasure cabinet" described in Patent Document 1, no consideration is given to space-saving of the installation area or the leakage of the contaminant to the outside of the device caused by the re-scattering of the contaminant when the HEPA filter is replaced.

An object of the present invention is to provide a safety work device such as a safety cabinet or a draft chamber in which space is saved by minimizing a depth width of the device in a case where a plurality of HEPA filters are installed in an exhaust system to suppress the leakage of a contaminant to an outside of the device to as close to zero as possible.

Solutions to Problems

In order to solve the foregoing problems, as one example of a "safety work device" of the present invention, there is provided a safety work device including: a work space; a front shutter covering a part of an opening portion of a front surface of the work space; a work opening portion below the front shutter, through which a worker puts hands to perform work; a rear port provided at a lower portion of a back surface of the work space to suction air in the work space; and an exhaust flow path provided behind the back surface of the work space to exhaust the air in the work space. A first HEPA filter for exhaust is disposed in a vertical direction in the exhaust flow path and behind the rear port, and a second HEPA filter for exhaust is disposed in the vertical direction in the exhaust flow path and on a downstream side of the first HEPA filter.

In addition, as another example of the "safety work device" of the present invention, during a normal operation, a pre-filter that recovers coarse dust is attached to the rear port, and when the first HEPA filter is replaced, the pre-filter is removed, and a bag-in/bag-out type first HEPA filter replacement port is configured to be attachable to the rear port.

In addition, as another example of the "safety work device" of the present invention, a bag-in/bag-out type second HEPA filter replacement port is configured to be attachable to the back surface of the work space on a work space side of the second HEPA filter.

Effects of the Invention

According to the present invention, by disposing the first HEPA filter for exhaust in the vertical direction behind the rear port provided on the back surface of the work space, by disposing the second HEPA filter in the vertical direction in the exhaust flow path and on the downstream side of the first HEPA filter, and by reversing the intake and exhaust direction between the HEPA filters disposed vertically, the depth width of the device is minimized to save space, so that a plurality of the HEPA filters for exhaust can be installed.

In addition, a structure can be implemented in which when the first HEPA filter is replaced, an upstream side which is a contamination side faces downward, and when the second HEPA filter is replaced, an upstream side which is a contamination side faces upward, and the leakage of a contaminant to an exhaust side caused by the re-scattering of the contaminant when the HEPA filters are replaced can be suppressed.

Tasks, configurations, and effects other than those described above will be apparent from the description of the following embodiments.

MODE FOR CARRYING OUT THE INVENTION

Prior to describing embodiments of the present invention, a safety cabinet of the related art provided with two HEPA filters for exhaust to detoxify contaminated air is described.

Figure 1:
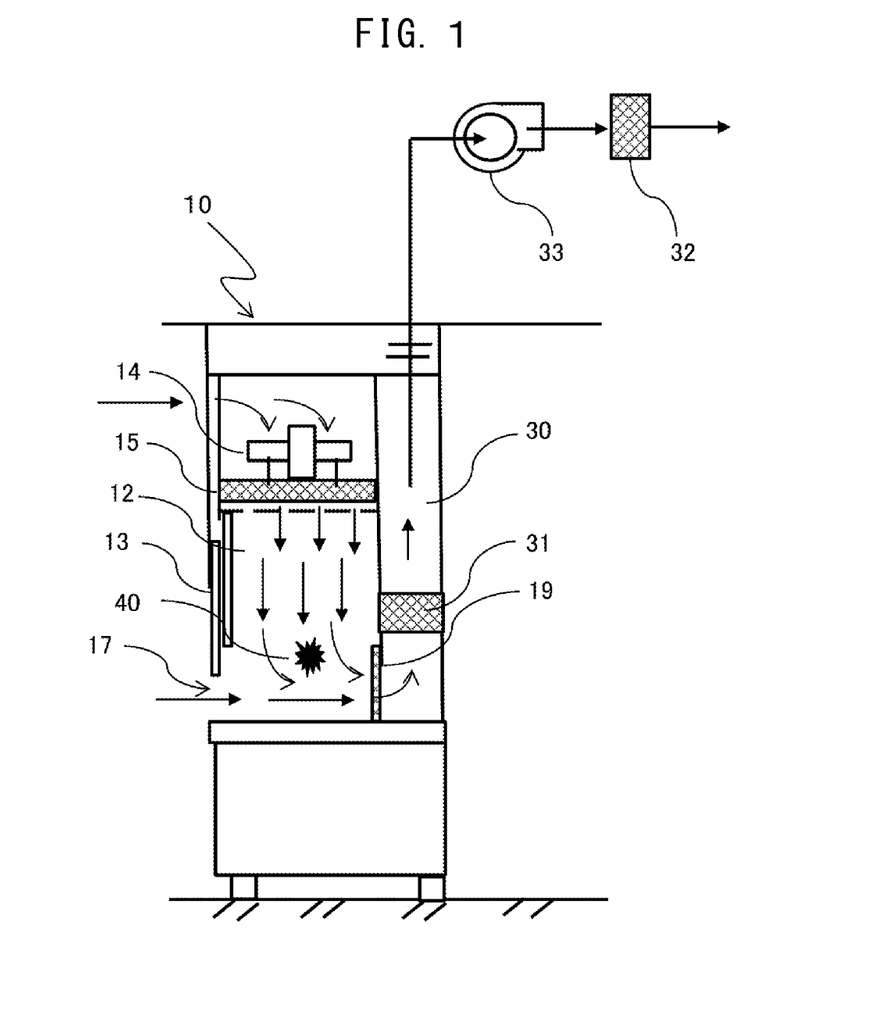
FIG. 1 is a schematic view showing one example of a safety cabinet provided with two HEPA filters for exhaust.

FIG. 1 shows one example of a safety cabinet provided with two HEPA filters for exhaust. The figure is a schematic side cross-sectional view of the safety cabinet as viewed from the right.

A work space 12 of which the front surface is formed of a front shutter 13 is provided inside a safety cabinet 10. An air supply fan 14 is provided above the work space 12, and supplies clean air, which has passed through a HEPA filter 15 for air supply, to the work space 12. An exhaust flow path 30 is provided at a back portion of the work space 12, and a first HEPA filter 31 for exhaust is provided in the exhaust flow path 30. An exhaust fan 33 is provided above the safety cabinet 10, and a second HEPA filter 32 for exhaust is provided in a building exhaust duct system therebeyond or in a machinery room. Air supplied to the work space 12 from above and air taken into the work space 12 from a work opening portion 17 flow through a pre-filter 19 and the exhaust flow path 30, and a contaminant 40 is removed by the first HEPA filter 31 and the second HEPA filter 32.

However, the second HEPA filter 32 is provided above the safety cabinet 10, the second HEPA filter 32 requires the preparation of a storage box separate from the safety cabinet, and the replacement of the filter becomes work at a high location, so that the work becomes difficult.

Figure 2:
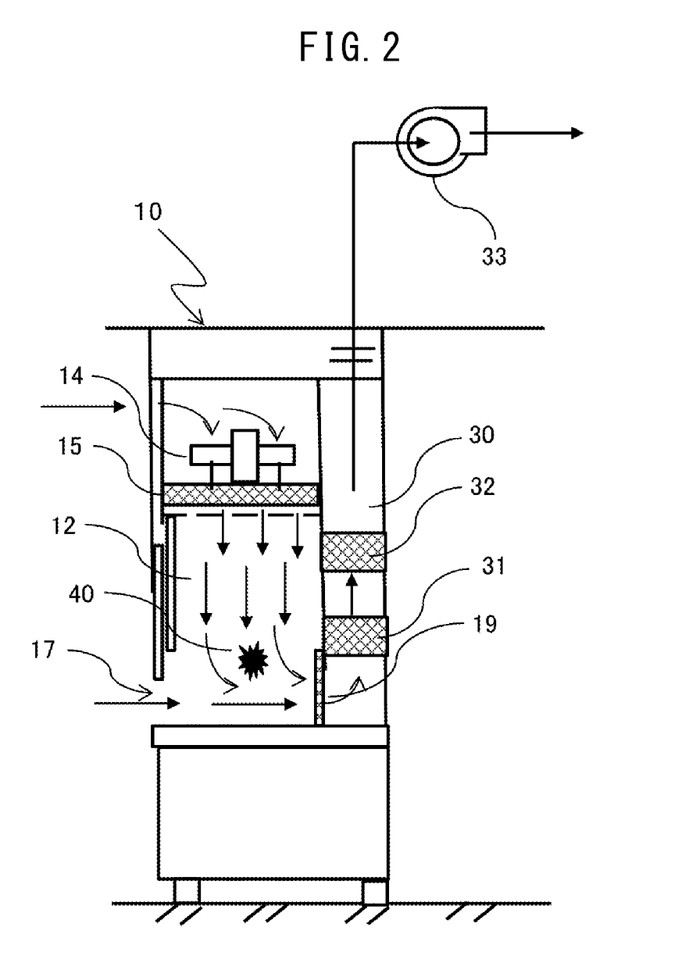
FIG. 2 is a schematic view showing another example of a safety cabinet provided with two HEPA filters for exhaust.

FIG. 2 shows another example of a safety cabinet provided with two HEPA filters for exhaust. The figure is a schematic side cross-sectional view of the safety cabinet as viewed from the right.

The difference from the safety cabinet in FIG. 1 is that instead of providing the second HEPA filter above the safety cabinet 10, the second HEPA filter 32 is provided in the exhaust flow path 30 of the safety cabinet 10.

However, similarly to the safety cabinet in FIG. 1, the HEPA filters are installed horizontally, and in order to keep the passing air speed to be equal to or less than the level required to maintain the collection efficiency of the HEPA filters, the depth size has to be increased, and the depth width of the device needs to be increased.

The present invention provides a safety work device such as a safety cabinet or a draft chamber that considers minimizing a depth width of the device to save space, and suppressing the leakage of a contaminant caused by the re-scattering of the contaminant when the HEPA filters are replaced, by installing a plurality of HEPA filters for exhaust in a vertical direction (vertical placement) and by forming an airflow that reverses an intake and exhaust direction between the HEPA filters disposed vertically.

Hereinafter, embodiments of the present invention will be described with reference to the drawings. However, the present invention should not be interpreted as being limited to the description of the embodiments set forth below. It will be easily understood by those skilled in the art that specific configurations of the present invention can be changed without departing from the concept or scope of the present invention.

Incidentally, in each drawing for describing the embodiments, the same names and reference signs are assigned to the same components, and the repeated description thereof will be omitted.

First Embodiment

Figure 3:
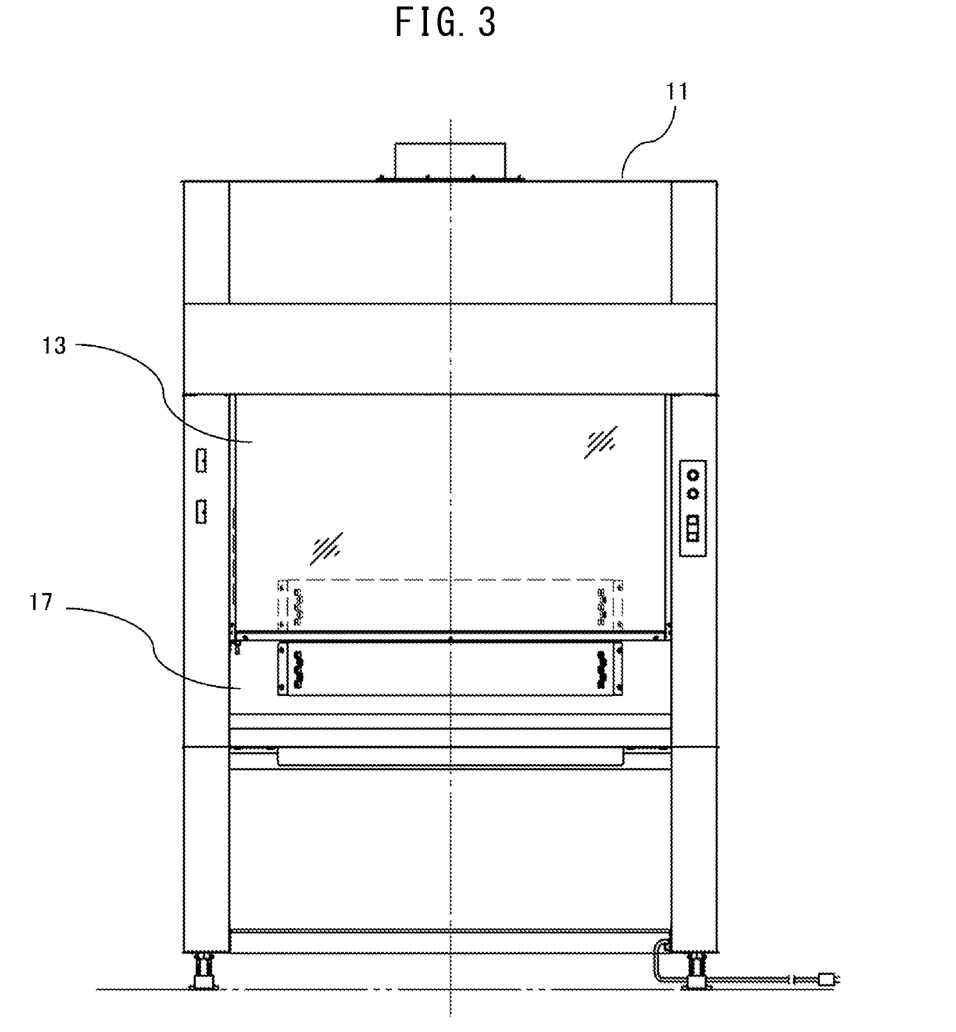
FIG. 3 is a front view of a draft chamber of a first embodiment.
Figure 4:
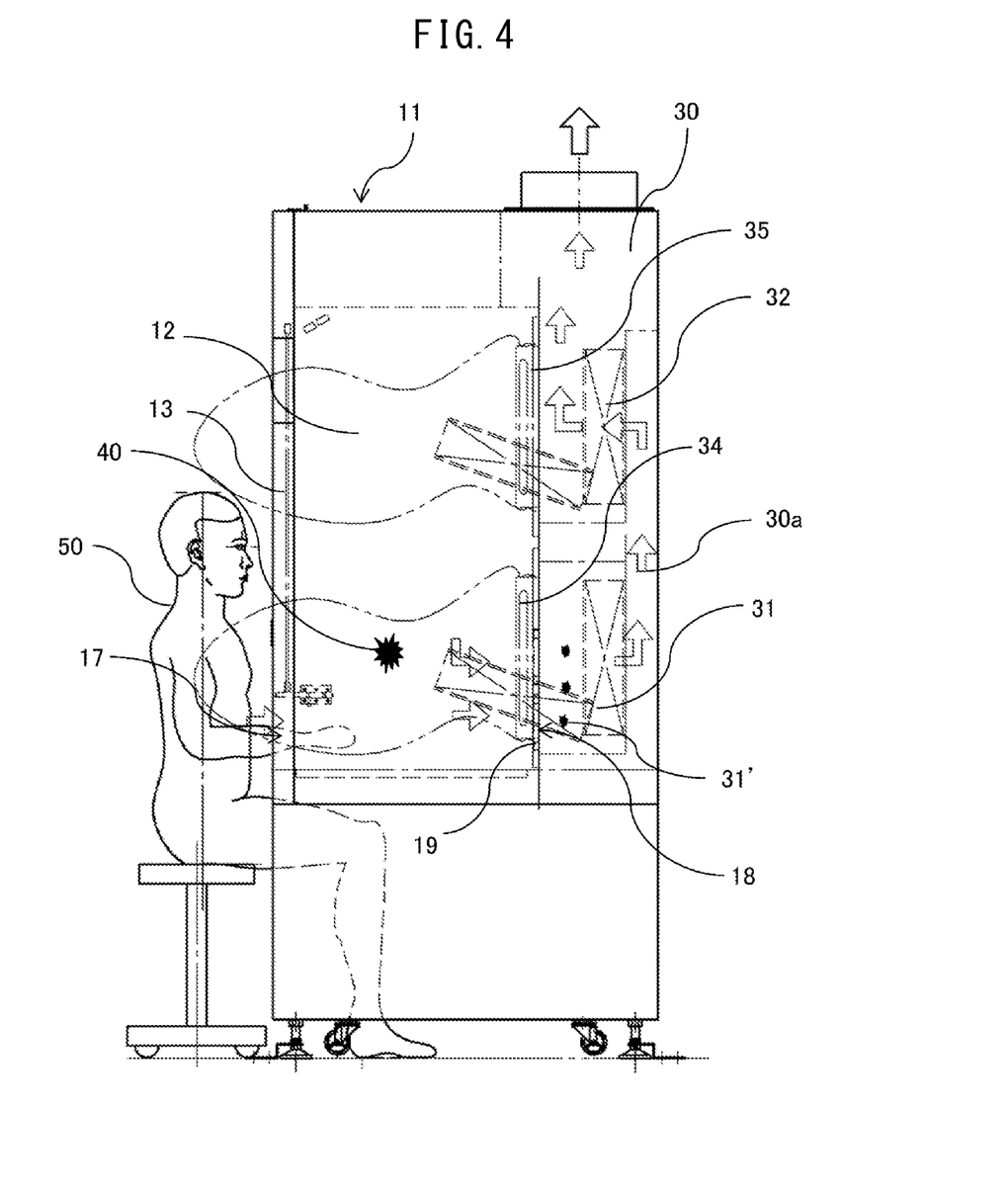
FIG. 4 is a right side view of the draft chamber of the first embodiment.
Figure 5:
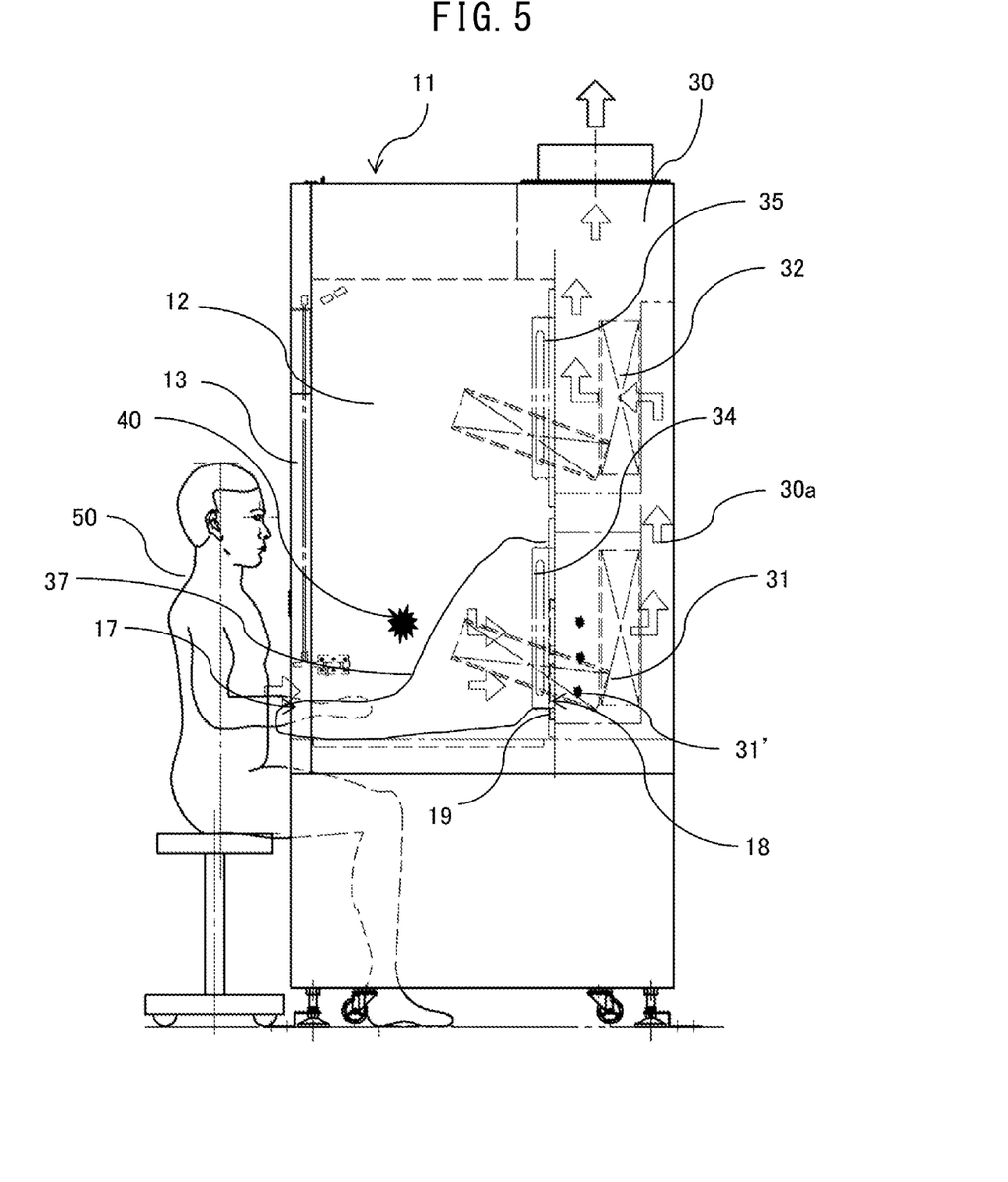
FIG. 5 is a view in which a lower vinyl bag is taken out in FIG. 4.

In a first embodiment, the present invention is used for a draft chamber which is one type of safety work device. FIGS. 3 to 5 show the draft chamber of the first embodiment of the present invention. FIG. 3 is a front view of the draft chamber of the first embodiment, and FIG. 4 is a right side view. In FIG. 4, taken-out vinyl bags are indicated by two-dot chain lines. In addition, FIG. 5 is a view in which in the draft chamber of FIG. 4, the vinyl bag is taken out from a replacement port for a lower HEPA filter.

As shown in FIG. 4, the work space 12 is provided inside a draft chamber 11. The front shutter 13 moving up and down is provided on a front surface of the work space 12, and a worker 50 puts the hands from the work opening portion 17 below the front shutter 13 and performs work. The exhaust flow path 30 is provided in an up-down direction behind the work space 12, and two HEPA filters for exhaust are provided in the exhaust flow path 30. Incidentally, although not shown in the figure, similarly to the safety cabinet shown in FIG. 2, the exhaust fan 33 is provided above the draft chamber 11.

As a characteristic configuration of the draft chamber of the present embodiment, the first HEPA filter 31 for exhaust is disposed in a vertical direction (vertical placement) near a rear port 18 on a back surface of the work space 12. Namely, the pre-filter 19 that removes coarse dust is provided at the rear port 18 of a lower portion of the back surface of the work space 12, and the first HEPA filter 31 is disposed in the vertical direction to be parallel to the pre-filter 19 and in proximity to the pre-filter 19. In the exhaust flow path 30, the second HEPA filter 32 for exhaust is disposed in the vertical direction (vertical placement) on the same plane on which the first HEPA filter 31 is installed. A flow path toward an intake side behind the second HEPA filter 32, namely, a reverse flow path 30a that reverses an intake and exhaust direction is provided along a back wall of the draft chamber on an exhaust side behind the first HEPA filter 31. By disposing the two HEPA filters for exhaust in the vertical direction, the depth dimension of the device can be minimized. Here, during normal use, the pre-filter 19 is installed at the rear port 18. When the first HEPA filter is replaced, the pre-filter 19 is removed and a first HEPA filter replacement port 34 is installed. By attaching the first HEPA filter replacement port 34 only when the HEPA filter is replaced, an installation space of the work space 12 is minimized.

Air supplied to the work space 12 is taken in only from the work opening portion 17, and flows through the rear port 18 and the exhaust flow path 30. Then, the contaminant 40 in the work space is filtered and removed by the first HEPA filter 31 and the second HEPA filter 32.

The pre-filter 19 is installed in front of the first HEPA filter 31 for exhaust and at the rear port 19 of a lower portion of a back wall of the work space 12, and the first HEPA filter can be replaced by exchanging a fitting to which the pre-filter 19 is fixed with the first HEPA filter replacement port 34 with a vinyl bag attached, and by attaching the first HEPA filter replacement port 34 with a vinyl bag attached. Similarly, a bag-in/bag-out type second HEPA filter replacement port 35 for replacing the second HEPA filter is provided in front of the second HEPA filter 32 and on the back wall of the work space 12, and a vinyl bag is folded and stored. Since the second HEPA filter replacement port 35 is disposed on an upper side of the work space 12, unlike the first HEPA filter replacement port 34, the second HEPA filter replacement port 35 may be always attached as long as the second HEPA filter replacement port 35 does not interfere with work.

FIG. 5 shows a state where in order to replace the first HEPA filter 31, the first HEPA filter replacement port 34 is attached to the rear port 18, and a vinyl bag 37 is pulled out from the first HEPA filter replacement port 34. When the HEPA filter is replaced, instead of the fitting to which the pre-filter 19 is fixed, the first HEPA filter replacement port 34 with a vinyl bag attached is attached. Then, the vinyl bag 37 is pulled out from the first HEPA filter replacement port 34, and the first HEPA filter 31 is removed through the vinyl bag. At this time, if work is performed in a state where an exhaust fan provided on a building side is in operation, the work space 12 becomes negative pressure, and the contaminant 40 does not leak to a worker 50 side. Then, as indicated by reference sign 31', the first HEPA filter is inclined and stored in the vinyl bag 37. Then, although not shown, a portion of the vinyl bag, which stores the HEPA filter, is cut by a cutting and welding machine, and the HEPA filter 31 is sealed in the vinyl bag 37.

Figure 6A:
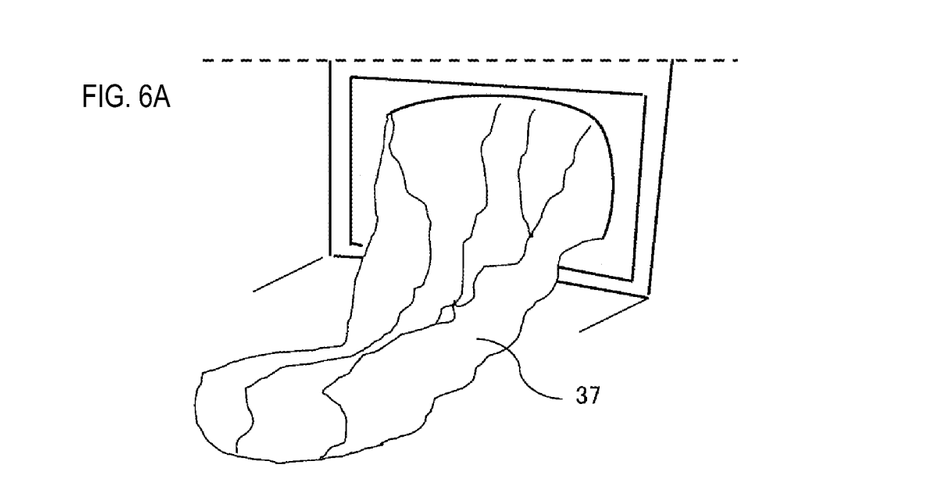
FIGS. 6A-B are a view showing the vinyl bag.
Figure 6B:
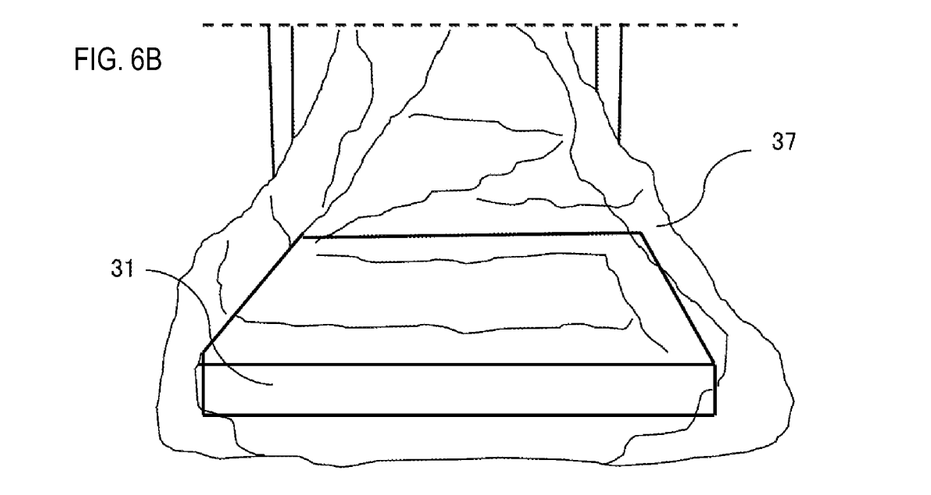

FIGS. 6A-B show one example of a view in which the vinyl bag is taken out from the replacement port. As shown in FIG. 6A, the vinyl bag 37 is taken out from a folded state. Then, as shown in FIG. 6B, the HEPA filter 31 is stored in the vinyl bag 37. Thereafter, a portion of the vinyl bag 37, which stores the HEPA filter, is cut and thermally welded to seal the HEPA filter 31 in the vinyl bag 37.

According to the present embodiment, by disposing the first HEPA filter 31 for exhaust in the vertical direction in proximity to the rear port 18 on the back surface of the work space, and by disposing the second HEPA filter 32 for exhaust in the vertical direction on the same plane on which the first HEPA filter 31 for exhaust, the depth width of the device can be minimized.

In addition, by disposing the first HEPA filter 31, which is the most contaminated, in the vertical direction near the rear port 18 on the back surface of the work space, and by attaching the first HEPA filter replacement port 34 to the rear port 19 at the time of replacement, the first HEPA filter 31 which is the most contaminated can be replaced without a contaminated surface facing upward, and the leakage of the contaminant to the exhaust side caused by re-scattering of the contaminant can be suppressed.

In addition, there is a possibility that the contaminant 40 which cannot be collected by the first HEPA filter 31 for exhaust adheres to the intake side of the second HEPA filter 32 for exhaust, and when the second HEPA filter 32 for exhaust is replaced, the second HEPA filter 32 may vibrate due to the removal of an attachment portion, or the like and the contaminant may scatter. However, a contaminated surface of the second HEPA filter 32 faces a first HEPA filter 31-side space, namely, the back wall of the draft chamber, and even when the contaminant re-scatters, the contaminant leaks to the reverse flow path 30a along the back wall of the draft chamber, and falls downward. For this reason, by removing the second HEPA filter after the scattered has contaminant fallen, the exhausting of the contaminant as it is can be suppressed.

In addition, by providing the bag-in/bag-out type replacement port 34 on a work space side of the first HEPA filter 31 for exhaust, and by storing the first HEPA filter 31 in the vinyl bag 37, the contaminant can be prevented from re-scattering when the HEPA filter is replaced, and replacement can be performed safely with good workability. The same applies to the second HEPA filter 32 for exhaust.

Second Embodiment

Figure 7:
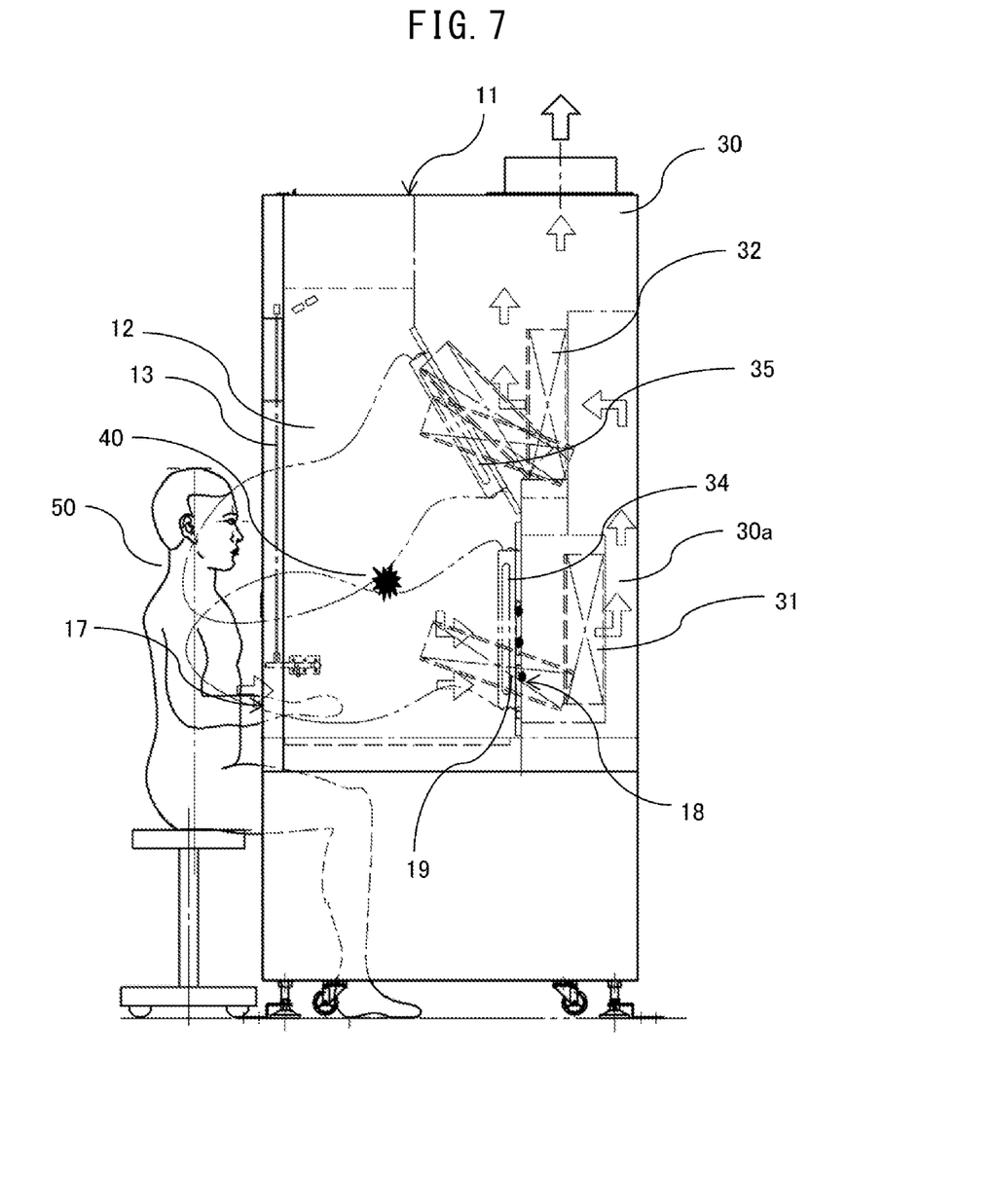
FIG. 7 is a right side view of a draft chamber of a second embodiment.
Figure 8:
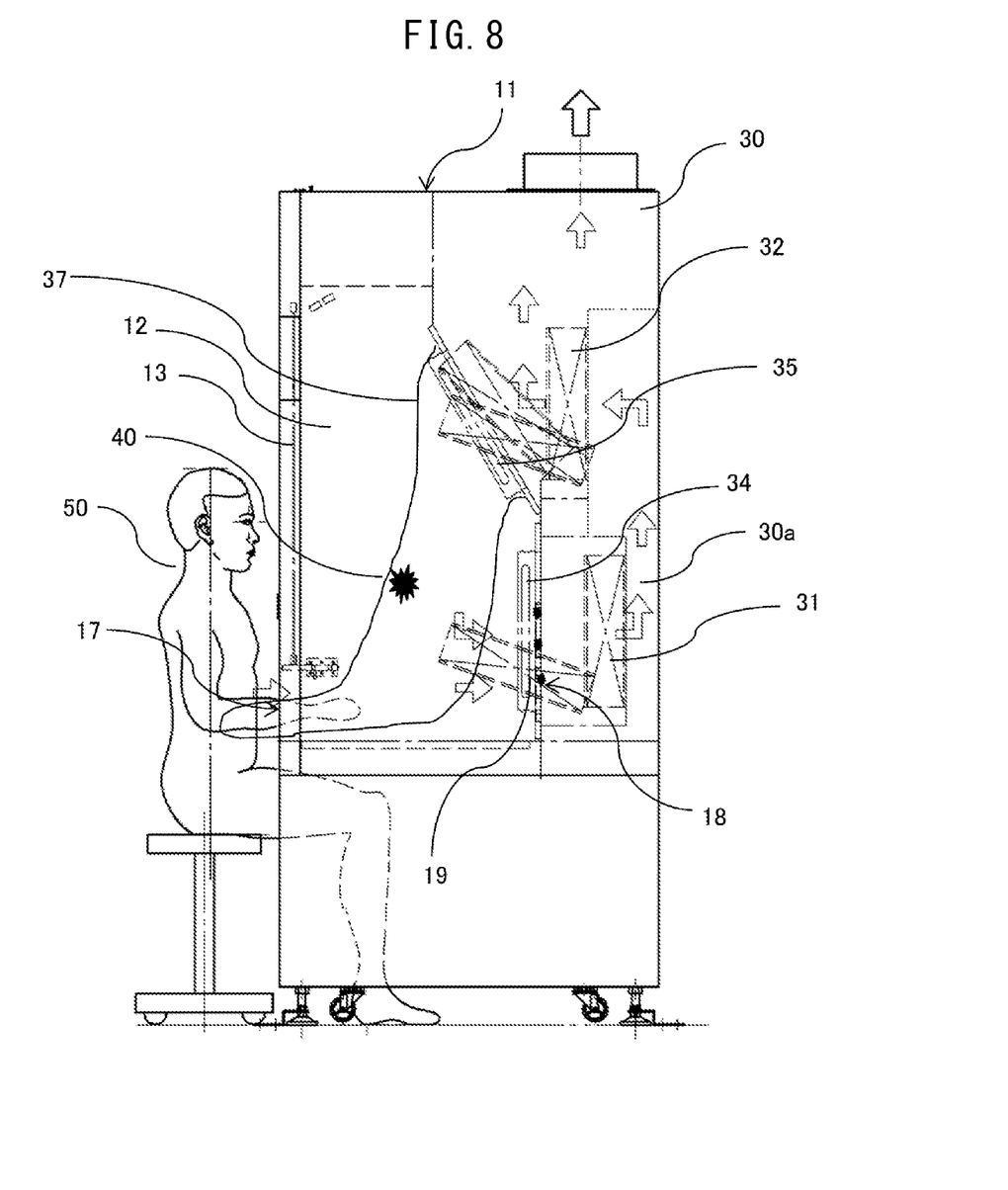
FIG. 8 is a view in which an upper vinyl bag is taken out in FIG. 7.

FIGS. 7 and 8 show a draft chamber of a second embodiment of the present invention. FIG. 7 is a right side view of the draft chamber of the second embodiment. In FIG. 7, taken-out vinyl bags are indicated by two-dot chain lines. In addition, FIG. 8 is a view in which in the draft chamber of FIG. 7, a vinyl bag is taken out from a replacement port for an upper HEPA filter. The present embodiment is an example in which installation surfaces of the first HEPA filter 31 for exhaust and the second HEPA filter 32 are not on the same plane, and are disposed at offset positions, and the HEPA filter replacement port 35 for the second HEPA filter 32 is obliquely disposed.

As shown in FIG. 7, the first HEPA filter 31 is disposed in the vertical direction in proximity to the rear port 18 on the back surface of the work space 12, the installation surface of the second HEPA filter 32 is disposed above the first HEPA filter 31 at a position offset toward a work space 12 side, and the HEPA filter replacement port 35 for the second HEPA filter 32 is obliquely disposed with an upper portion of the HEPA filter replacement port 35 inclined toward the work space 12 side.

FIG. 8 shows a state where the vinyl bag 37 is pulled out to replace the second HEPA filter. When the second HEPA filter 32 is replaced, the vinyl bag 37 is pulled out and the second HEPA filter 32 is inclined forward and removed. Then, the removed second HEPA filter 32 is moved downward and stored in the vinyl bag 37. Then, although not shown, a portion of the vinyl bag 37, which stores the HEPA filter, is cut and thermally welded to seal the HEPA filter 32 in the vinyl bag 37.

Other configurations such as replacing the first HEPA filter 31 are the same as those of the draft chamber of the first embodiment.

According to the present embodiment, by disposing the installation surface of the second HEPA filter 32 to be offset toward the work space 12 side, as shown in the figures, the flow path to the second HEPA filter 32 after passing through the first HEPA filter 31 can be widened, airflow resistance can be suppressed, and energy-saving effect can be expected. In addition, by obliquely disposing the second HEPA filter replacement port 35 with the upper portion of the second HEPA filter replacement port 35 inclined toward the work space 12 side, the second HEPA filter 32 is easily stored in the vinyl bag 37, and workability when the HEPA filter is replaced is improved.

In each of the embodiments, the full exhaust type draft chamber has been described in which air taken in from outside the device passes through the work space, the contaminant is removed from the air by the HEPA filters, and all of the air is exhausted outside the device; however, the present invention can also be used for a local exhaust device that has the same full exhaust type structure and that handles organic solvents or specific chemical substances.

Third Embodiment

Figure 9:
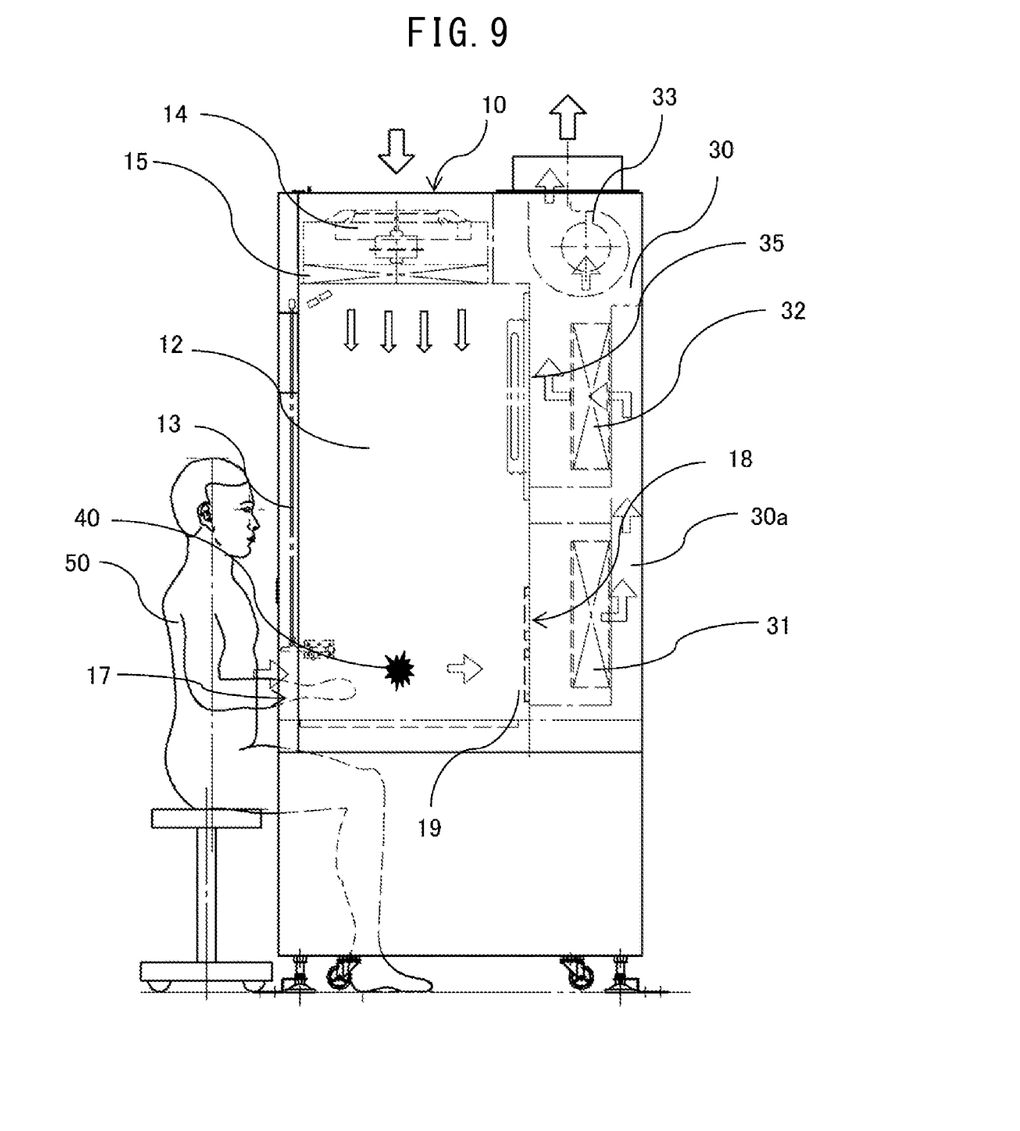
FIG. 9 is a right side view of a safety cabinet of a third embodiment.

In a third embodiment, the present invention is used for a safety cabinet which is one type of safety work device. FIG. 9 shows a safety cabinet of the third embodiment of the present invention. FIG. 9 is a right side cross-sectional view of the safety cabinet of the third embodiment.

As shown in FIG. 9, the work space 12 is provided inside the safety cabinet 10. An air supply fan 14 is provided above the work space 12, and supplies clean air, which has passed through a HEPA filter 15 for air supply, to the work space 12. The front shutter 13 moving up and down is provided on a front surface of the work space 12, and a worker 50 puts the hands from the work opening portion 17 below the front shutter 13 and performs work. The exhaust flow path 30 is provided in an up-down direction behind the work space 12, and two HEPA filters for exhaust are provided in the exhaust flow path 30. The exhaust fan 33 is provided at an outlet of the exhaust flow path 30.

The safety cabinet of the present embodiment has the same disposition configuration of the HEPA filters for exhaust as that of the draft chamber of the first embodiment. Namely, the first HEPA filter 31 for exhaust is disposed in the vertical direction (vertical placement) near the rear port 18 on the back surface of the work space 12. Then, in the exhaust flow path 30, the second HEPA filter 32 for exhaust is disposed in the vertical direction (vertical placement) on the same plane on which the first HEPA filter 31 is installed. An exhaust flow path toward an intake side behind the second HEPA filter 32, namely, the reverse flow path 30*a* that reverses an intake and exhaust direction is provided along a back wall of the safety cabinet on an exhaust side behind the first HEPA filter 31. By disposing the two HEPA filters for exhaust in the vertical direction, the depth dimension of the device can be minimized.

Air supplied to the work space 12 from above the work space 12 and air taken in from the work opening portion 17 flow through the rear port 18 and the exhaust flow path 30. Then, the contaminant 40 in the work space is filtered and removed by the first HEPA filter 31 and the second HEPA filter 32, and the air is exhausted outside the device.

In the safety cabinet of the present embodiment, the replacement of the first HEPA filter 31 for exhaust and the second HEPA filter 32 for exhaust can also be performed in the same manner as in the draft chamber of the first embodiment. Namely, when the first HEPA filter is replaced, the pre-filter 19 is removed from the rear port 18, the first HEPA filter replacement port 34 is installed, and the first HEPA filter 31 is stored in the vinyl bag 37. In addition, when the second HEPA filter 32 is replaced, the vinyl bag 37 is pulled out from the second HEPA filter replacement port 35, and the second HEPA filter 32 is stored in the vinyl bag 37.

According to the present embodiment, in the safety cabinet, by disposing the first HEPA filter for exhaust in the vertical direction behind the rear port provided on the back surface of the work space, by disposing the second HEPA filter in the vertical direction in the exhaust flow path and on a downstream side of the first HEPA filter, and by reversing the intake and exhaust direction between the HEPA filters disposed vertically, the depth width of the device is minimized to save space, so that a plurality of the HEPA filters for exhaust can be installed.

In addition, a structure can be implemented in which when the first HEPA filter is replaced, an upstream side which is a contamination side faces downward, and when the second HEPA filter is replaced, an upstream side which is a contamination side faces upward, and the leakage of the contaminant to the exhaust side caused by the re-scattering of the contaminant when the HEPA filters are replaced can be suppressed.

In the present embodiment, the full exhaust type safety cabinet has been described in which air taken in from outside the device passes through the work space, the contaminant is removed from the air by the HEPA filters, and all of the air is exhausted outside the device; however, the present invention can also be used for a recirculation type safety cabinet that recirculates air to be exhausted by returning some of the air to the work space.

In addition, in the safety cabinet as well, similarly to the draft chamber of the second embodiment, the first HEPA filter 31 may be disposed in the vertical direction in proximity to the rear port 18 on the back surface of the work space 12, the second HEPA filter 32 may be disposed in the vertical direction above the first HEPA filter 31 at a position offset toward the work space 12 side, and the HEPA filter replacement port 35 for the second HEPA filter 32 may be obliquely disposed with an upper portion of the HEPA filter replacement port 35 is inclined toward the work space 12 side.

Incidentally, the present invention is not limited to the above-described embodiments, and includes various modification examples. For example, the above-described embodiments have been described in detail to facilitate understanding of the present invention, and are not necessarily limited to including all the described configurations. In addition, a part of the configuration of one embodiment can be replaced with the configuration of another embodiment, and the configuration of another embodiment can be added to the configuration of one embodiment. In addition, other configurations can be added to, removed from, or replaced with a part of the configuration of each embodiment.

REFERENCE SIGNS LIST

10 Safety cabinet
11 Draft chamber

12 Work space
13 Front shutter
14 Air supply fan
15 HEPA filter for air supply
17 Work opening portion
18 Rear port
19 Pre-filter
30 Exhaust flow path
30a Reverse flow path that reverses intake and exhaust direction
31 First HEPA filter for exhaust
32 Second HEPA filter for exhaust
33 Exhaust fan
34 First HEPA filter replacement port
35 Second HEPA filter replacement port
37 Vinyl bag
40 Contaminant
50 Worker

The invention claimed is:

1. A safety work device comprising:
a work space;
a front shutter covering a part of an opening portion of a front surface of the work space;
a work opening portion below the front shutter, through which a worker puts hands to perform work;
a rear port provided at a lower portion of a back surface of the work space to suction air in the work space;
an exhaust flow path provided behind the back surface of the work space to exhaust the air in the work space, wherein a first HEPA filter for exhaust is disposed in a vertical direction in the exhaust flow path and behind the rear port, and a second HEPA filter for exhaust is disposed in the vertical direction in the exhaust flow path and on a downstream side of the first HEPA filter; and
a reverse flow path, on an exhaust side of the first HEPA filter, that reverses an intake and exhaust direction toward an intake side of the second HEPA filter along a back of the safety work device.

2. The safety work device according to claim 1, wherein the second HEPA filter is disposed on the same plane as a surface on which the first HEPA filter is installed.

3. The safety work device according to claim 1, wherein the second HEPA filter is disposed offset toward a work space side from the surface on which the first HEPA filter is installed.

4. The safety work device according to claim 1, wherein the reverse flow path leads toward an intake side of the second HEPA filter along a back surface of the safety work device.

5. The safety work device according to claim 1, wherein during a normal operation, a pre-filter that recovers coarse dust is attached to the rear port, and
when the first HEPA filter is replaced, the pre-filter is removed, and a bag-in/bag-out type first HEPA filter replacement port is configured to be attachable to the rear port.

6. The safety work device according to claim 5, wherein when the first HEPA filter is replaced, the first HEPA filter is stored in a vinyl bag such that a contamination side faces downward.

7. The safety work device according to claim 1, wherein a bag-in/bag-out type second HEPA filter replacement port is configured to be attachable to the back surface of the work space on a work space side of the second HEPA filter.

8. The safety work device according to claim 7, wherein when the second HEPA filter is replaced, the second HEPA filter is stored in a vinyl bag such that a clean side faces downward.

9. The safety work device according to claim 7, wherein the second HEPA filter replacement port is obliquely disposed with an upper portion of the second HEPA filter replacement port inclined toward the work space side.

10. The safety work device according to claim 1, wherein the safety work device is a safety cabinet or a draft chamber.

11. The safety work device according to claim 1, wherein the reverse flow path is along an up-down direction behind the work space at the back of the safety work device.

12. The safety work device according to claim 1, wherein the reverse flow path removes contaminant in the work space downward from the first HEPA filter to the second HEPA filter.

* * * * *